US010436595B2

United States Patent
Wang et al.

(10) Patent No.: US 10,436,595 B2
(45) Date of Patent: Oct. 8, 2019

(54) METHOD AND SYSTEM FOR UPDATING LOCALIZATION MAPS OF AUTONOMOUS DRIVING VEHICLES

(71) Applicant: Baidu USA LLC, Sunnyvale, CA (US)

(72) Inventors: Quan Wang, San Jose, CA (US); Xianqiao Tong, San Jose, CA (US); Houchang Lu, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 15/423,412

(22) Filed: Feb. 2, 2017

(65) Prior Publication Data

US 2018/0216942 A1    Aug. 2, 2018

(51) Int. Cl.
| | |
|---|---|
| *G01C 21/32* | (2006.01) |
| *G01S 7/48* | (2006.01) |
| *G01S 17/89* | (2006.01) |
| *B60W 10/04* | (2006.01) |
| *B60W 10/18* | (2012.01) |
| *B60W 10/20* | (2006.01) |
| *B60W 30/09* | (2012.01) |
| *G01S 13/93* | (2006.01) |
| *G01S 17/93* | (2006.01) |
| *G05D 1/00* | (2006.01) |
| *G05D 1/02* | (2006.01) |

(52) U.S. Cl.
CPC ............ *G01C 21/32* (2013.01); *G01S 7/4808* (2013.01); *G01S 17/89* (2013.01); *B60W 10/04* (2013.01); *B60W 10/18* (2013.01); *B60W 10/20* (2013.01); *B60W 30/09* (2013.01); *G01S 13/931* (2013.01); *G01S 17/936* (2013.01); *G05D 1/0088* (2013.01); *G05D 1/0236* (2013.01); *G05D 1/0242* (2013.01); *G05D 1/0257* (2013.01)

(58) Field of Classification Search
CPC ....... G01C 21/32; B60W 10/04; B60W 10/18; B60W 10/20; B60W 30/09; G01S 19/13; G01S 17/89; G01S 13/931; G01S 17/936; G01S 7/4808; G05D 1/0088; G05D 1/0236; G05D 1/0242; G05D 1/0257
See application file for complete search history.

(56) References Cited

U.S. PATENT DOCUMENTS

| | | | |
|---|---|---|---|
| 9,243,916 B2 * | 1/2016 | Roumeliotis | G01C 21/165 |
| 9,612,123 B1 * | 4/2017 | Levinson | G01C 21/32 |
| 9,623,905 B2 * | 4/2017 | Shashua | B62D 15/025 |
| 9,690,293 B2 * | 6/2017 | Shashua | G05D 1/0088 |

(Continued)

*Primary Examiner* — Courtney D Heinle
(74) *Attorney, Agent, or Firm* — Womble Bond Dickinson (US) LLP

(57) ABSTRACT

In one embodiment, a self-aware self-evolved self-contained localization map system for an autonomous driving vehicle (ADV) is disclosed. The localization map system collects ADV localization data and real-time poses for analysis in view of a first localization map of the ADV. The analysis determines confidence scores based on rankings of similarities scores of candidate poses, consistency of the real-time pose, and spatial or temporal completeness of a map feature space surrounding the ADV. The subset of the collected localization data is aligned with the first localization map based on a highest ranked candidate pose and is applied onto the first localization map based on the determined confidence scores to generate a second localization map to subsequently determine a location of the ADV.

21 Claims, 11 Drawing Sheets

(56) References Cited

U.S. PATENT DOCUMENTS

| | | | |
|---|---|---|---|
| 9,696,719 B2* | 7/2017 | Aviel | G05D 1/0088 |
| 9,709,986 B2* | 7/2017 | Gdalyahu | G05D 1/0088 |
| 9,760,090 B2* | 9/2017 | Shashua | G05D 1/0088 |
| 2015/0268058 A1* | 9/2015 | Samarasekera | G06K 9/00637 |
| | | | 701/409 |
| 2016/0236683 A1* | 8/2016 | Eggert | G01C 21/20 |
| 2016/0368505 A1* | 12/2016 | Sorstedt | B60W 30/12 |
| 2017/0010106 A1* | 1/2017 | Shashua | G01C 21/32 |
| 2017/0016740 A1* | 1/2017 | Cui | G01C 21/30 |
| 2017/0052032 A1* | 2/2017 | Miksa | G01C 21/28 |
| 2017/0124781 A1* | 5/2017 | Douillard | B60Q 1/26 |
| 2017/0248963 A1* | 8/2017 | Levinson | G05D 1/0278 |
| 2017/0261324 A1* | 9/2017 | Roumeliotis | G01C 21/165 |
| 2017/0270361 A1* | 9/2017 | Puttagunta | G06K 9/00664 |
| 2017/0277716 A1* | 9/2017 | Giurgiu | G06F 17/30241 |
| 2017/0329327 A1* | 11/2017 | Trigui | G05D 1/0061 |
| 2017/0343356 A1* | 11/2017 | Roumeliotis | G06T 7/00 |
| 2017/0372148 A1* | 12/2017 | Chen | G06K 9/00785 |
| 2018/0025235 A1* | 1/2018 | Fridman | G06K 9/00798 |

* cited by examiner

METHOD AND SYSTEM FOR UPDATING LOCALIZATION MAPS OF AUTONOMOUS DRIVING VEHICLES

TECHNICAL FIELD

Embodiments of the present invention relate generally to operating autonomous vehicles. More particularly, embodiments of the invention relate to updating localization maps of autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Maps are a fundamental component of an autonomous vehicles system. An autonomous driving vehicle (ADV) relies on various terrestrial maps to make decisions and perform various driving functions autonomously in real-time. For example, localization map may provide localization data for an ADV to determine a precise location of the ADV based on 2D or 3D scans of an environment surrounding the ADV. A road graph may provide road boundary, traffic light positions. A static map may provide static object information near the ADV to offload computational burden of the ADV.

Existing approaches to generate localization maps may be described as "top-down synchronization." In these approaches, dedicated map data collection cars, mounted with various sensors, such as, a global positioning satellite detector (GPS), inertial measurement unit sensor (IMU), radio detection and ranging (RADAR), and light detection and ranging (LIDAR) are driven on roadways to capture image data and corresponding coarse and/or fine poses of the cars. A pose may be described as a position (x, y, z) and orientation (azimuth, pitch, roll). Afterwards, these captured image data are image processed offline. The captured image data are processed with techniques, such as iterative closest point (ICP) or simultaneous localization and mapping (SLAM), which may or may not involve global optimization, to link together the captured image data into a unified localization map. Thereafter road graphs and static maps are generated from the unified localization map. After map generation, maps are synced to customers' autonomous driving vehicle in a top down fashion, hence the "top down synchronization" approach.

The disadvantages of the "top-down synchronization" map generation approach include inflexibilities in adapting to dynamic elements such as growing tress, accumulation of snow, and parked cars on the road when the image data is captured but subsequently moved; a high requirement on sensors and sensors calibration; and a high cost associated with maintaining dedicated data collection cars.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
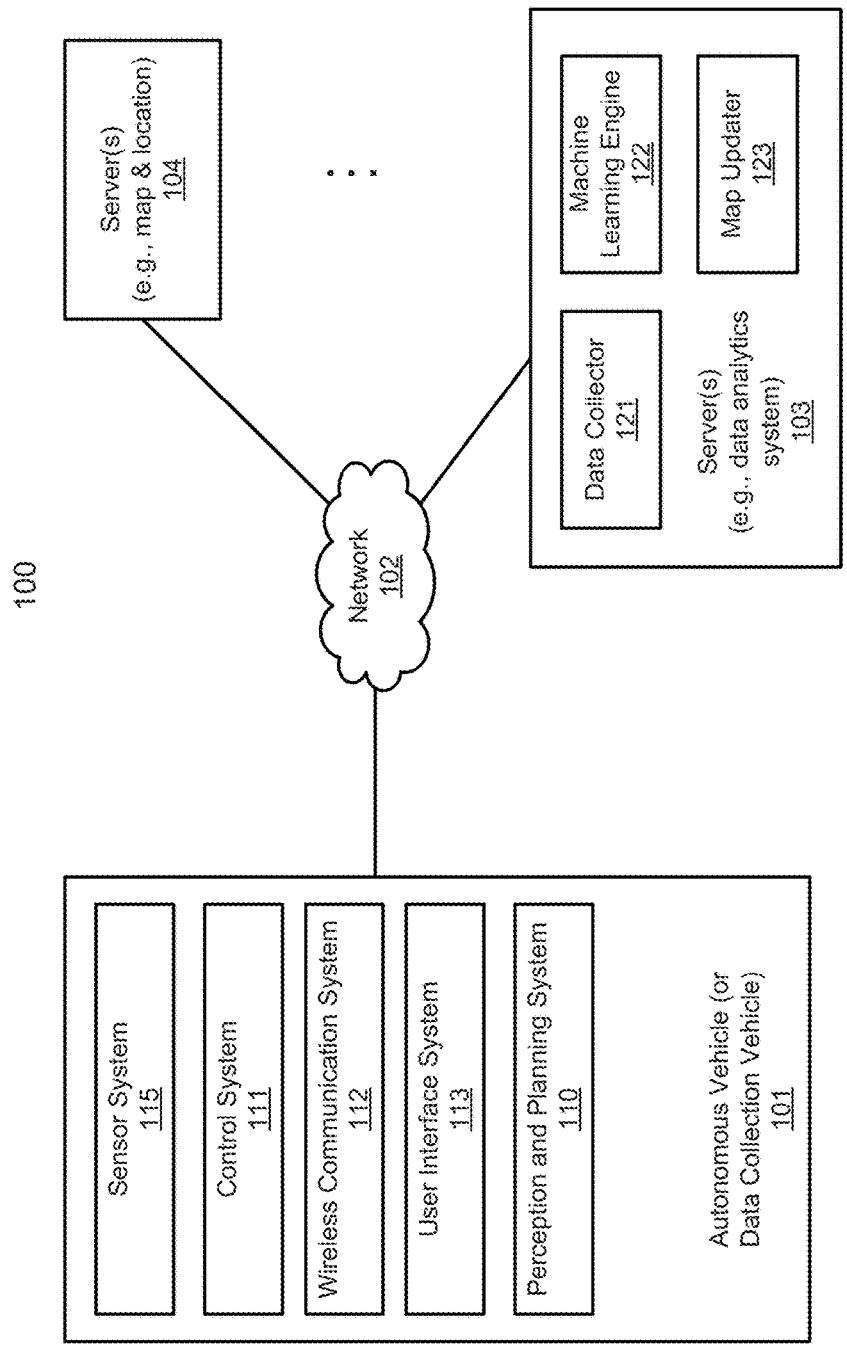
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. An "environment fragment" refers to a perceived or scanned fragment of the environment surround an ADV at a fixed point in time. A "pose" refers to a location and an orientation of a physical object.

According to some embodiments, a method or system of generating a self-contained self-evolving localization map or updating a self-contained self-evolving localization map with environment fragments of collected sensor data of an ADV is disclosed. Collected sensor data of an ADV may include localization data captured by sensors, such as LIDAR/RADAR scanners, of the surrounding and a real-time pose, e.g., location information provided by a global position satellite (GPS) and/or real time kinematic satellite (RTK) navigation data, and orientation information provided by an inertial measurement unit (IMU). The localization data may include scanned environment fragment data of two-dimensional (2D) or three-dimensional (3D) photographic image data or telemetry data from RADAR/LIDAR scanners such as 3D point cloud, or combination thereof. The environment fragment data may be reduced into discretized cells of a 2D or 3D occupancy grid to reduce the amount of raw measurement data.

In one embodiment, a system of an ADV collects localization data, e.g., 3D point cloud of a LIDAR scanner, and one or more real-time poses of the ADV. The localization data may be broken down into discretized cells, such as 10 cm×10 cm cells. Each collected real-time pose of the ADV may represent a coarse pose, such as a location data from a GPS unit with an error tolerance of three meters. The system generates a plurality of candidate poses from the collected real-time poses of the ADV. The system analyzes the collected localization data in view of a first localization map to determine a confidence score for the plurality of candidate poses. The system selects one of the candidate poses having a highest confidence score based on the analysis, and applies a subset of the collected localization data onto the first localization map based on the selected candidate pose to generate a second localization map, such that the second localization map is utilized to subsequently determine a location of the ADV. In another embodiment, the first localization map may be a blank map. The second localization map represents an updated version of the first localization map.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that may be configured to an autonomous mode in which the vehicle navigates through an environment with little or no input from a driver. Such an autonomous vehicle may include a sensor system having one or more sensors that are configured to detect information about the environment in which the vehicle operates. The vehicle and its associated controller(s) use the detected information to navigate through the environment. Autonomous vehicle 101 may operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
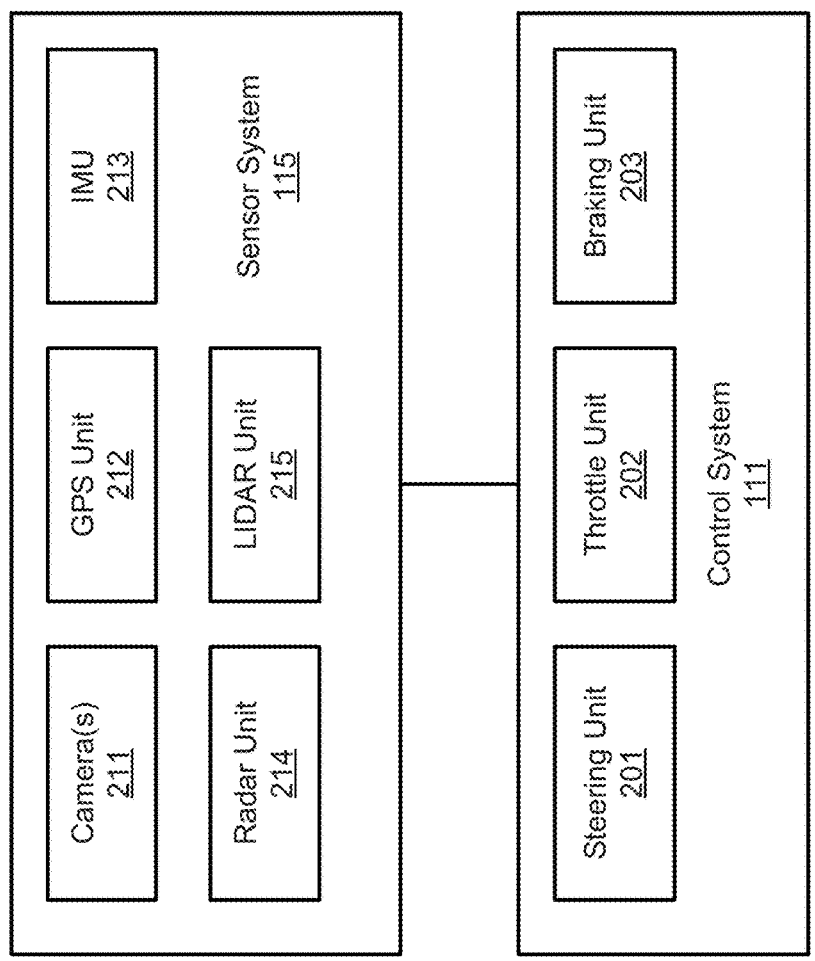
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a map analytics system to perform map analytics services for a variety of data collection vehicles or clients. In one embodiment, map analytics system 103 includes data collector 121, machine learning engine 122 and map updater 123. Data collector 121 collects map data from data collection vehicles, either autonomous vehicles or regular vehicles driven by human drivers. Map data include localization data and pose information of data collection vehicles at different points in time. Map data may further include information describing the driving environments at different points in time, such as, for example, routes (including starting and destination locations), MPOIs, road conditions, weather conditions, etc.

Based on the collected map data, machine learning engine 122 performs a localization technique, such as a real-time SLAM technique, real-time ICP technique, or LIDAR based localization method on the collected map data to tie fragments of localization data together into a unified localization map. Map updater 123 may update autonomous vehicle 101 with the unified localization map through network 102.

According to one embodiment, a self-contained self-evolving localization map of an ADV may be updated by the ADV from sensor data or perceived environment fragments. The system collects localization data, e.g., 3D point cloud of a LIDAR scanner, and a real-time pose of the ADV. The localization data can be broken down into discretized cells, such as 10 cm×10 cm cells and the collected real-time pose of the ADV may represent a coarse pose, such as a location data from a GPS unit with an error tolerance of three meters. The system analyzes the collected localization data in view of a first localization map to determine a confidence score for the plurality of candidate poses. One of the candidate poses is selected having a highest confidence score based on the analysis. The system then applies a subset of the collected localization data onto the first localization map based on the selected candidate pose to generate a second localization map, such that the second localization map is utilized to subsequently determine a location of the ADV. In one embodiment, the collected real-time pose of the ADV approximates a location and an orientation of the ADV and the plurality of candidate poses is determined based on the collected real-time pose and an error tolerance of the collected real-time pose.

In one embodiment, the collected localization data is analyzed by comparing the collected real-time pose with a previous real-time pose of the ADV to determine a first confidence score. In one embodiment, the first confidence is considered highest if the collected real-time pose is consistent with a previous real-time pose of the ADV. In another embodiment, the collected real-time pose is consistent with a previous real-time pose of the ADV if the collected real-time pose is within a distance traveled by the ADV from the previous real-time pose of the ADV in view of a time delay, such as the time delay between the collected real-time pose and the previous real-time pose.

In one embodiment, the collected localization data is analyzed by determining completeness of a subset of the first localization map corresponding to an ADV feature space surrounding the collected real-time pose to determine a second confidence score. The second confidence score is considered highest if the subset of the first localization map data is complete. Completeness refers to a spatial or temporal vacancy rate of discretized cells in a feature space. In another embodiment, completeness of a subset of the first localization map includes spatial completeness. Spatial completeness of a subset of the first localization map corresponding to the ADV feature space may be determined based on a spatial vacancy rate of the subset of the first localization map corresponding to the ADV feature space. In another embodiment, completeness of a subset of the first localization map includes temporal completeness. Temporal completeness of a subset of the first localization map corresponding to the ADV feature space may be determined based on an elapse of time of the cells in the subset of the first localization map corresponding to the ADV feature space, i.e., even if there is data in a cell, if the data is older than a predetermined age then the cell is treated as vacant for the purpose of determining a temporal vacancy rate.

In one embodiment, the collected localization data is analyzed by ranking each candidate pose of the plurality of candidate poses based on a similarity score for each of the plurality of poses to determine a third confidence score. The third confidence score is considered highest if a single candidate pose of the plurality of candidate poses has the highest ranking. In another embodiment, a similarity score is determined based on a similarity metric of the ADV feature space surrounding the collected real-time pose.

In one embodiment, a subset of the collected localization data is applied onto the first localization map by saving a subset of the collected localization data as incremental versions of environment fragments, or localization map tiles, in the first localization map. In another embodiment, a subset of the collected localization data is saved when the ADV is no longer interested in the subset of the collected localization data. In another embodiment, the ADV is no longer interested in the subset of the collected localization data when a distance between a position of the ADV and the subset of the collected localization data is above a predetermined threshold. In another embodiment, a distance between a position of the ADV and the subset of the collected localization data is above a predetermined threshold when the subset of the collected localization data is not in an ADV feature space surrounding the ADV.

Figure 3:
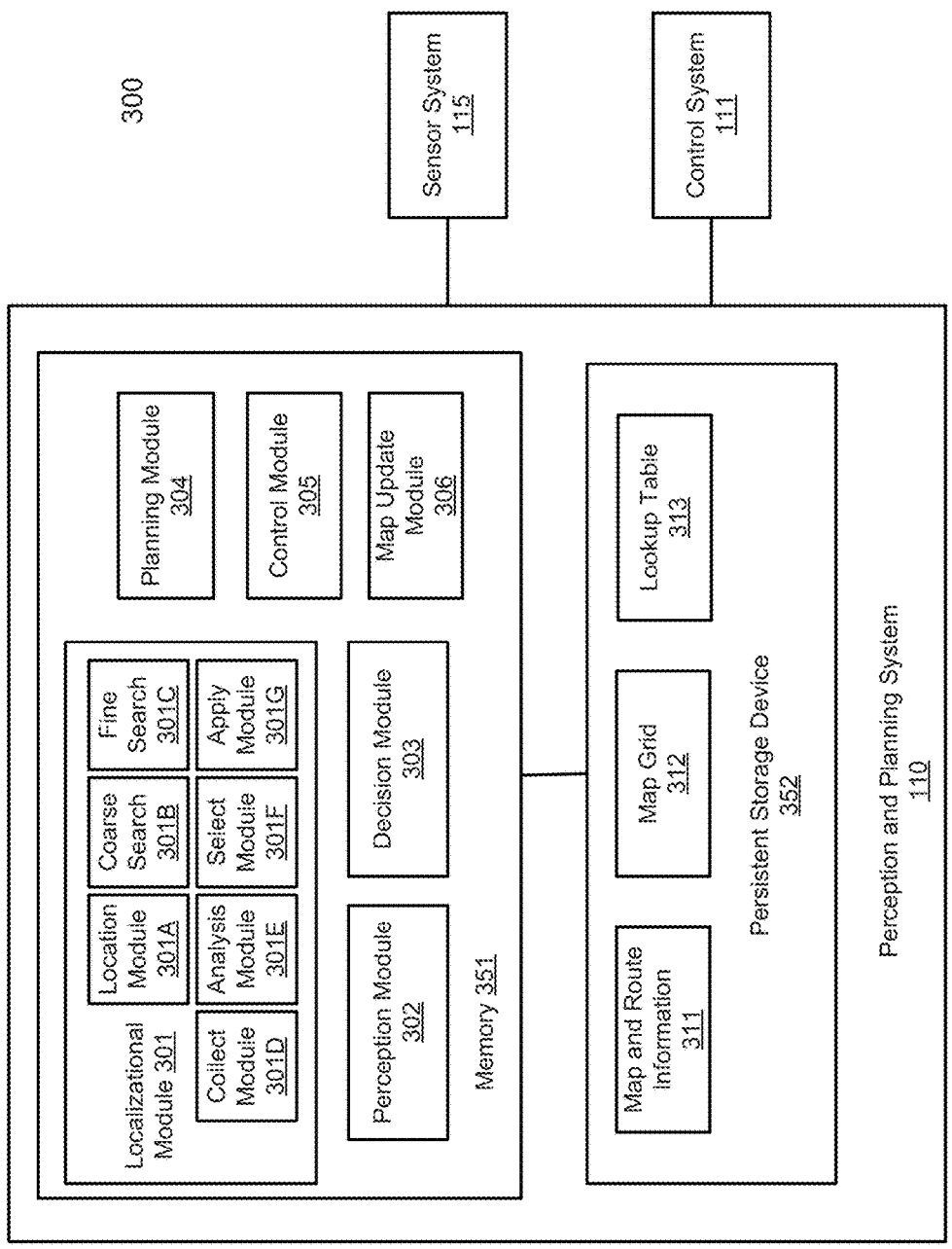
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, control module 305, and a map update module 306.

Some or all of modules 301-306 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-306 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

The goal of the localization module 301 is to determine with high accuracy a location of the ADV. ADV location can be approximated by a location coordinate, e.g., a GPS coordinate. The GPS coordinate can be used to retrieve a local version of a localization map (i.e., a high definition (HD) map) with a center at the GPS location and having an HD map feature space of cells of approximately 100 meters× 100 meters. Note, the term "local version" refers to a version of the localization map or HD map that is associated to the ADV but not necessarily stored locally to the ADV, i.e., the local version may be a baseline version of a localization map streamed from a central server to the ADV over a wireless network, a blank initial version, or a version self-evolved by the ADV local to the ADV. The sensors of the perception module 302 may provide data for an ADV feature space of cells of approximately 100 meters×100 meters surrounding the ADV. To determine the actual location of the ADV with respect to the HD map, localization module 301 can find a best match of a candidate cell in a candidate portion of the ADV feature space to the HD map. The match determines an offset of the ADV from the GPS-centered HD map feature space. This offset can be used, in conjunction with the HD map feature space, to determine the actual high accuracy location of the ADV.

Another objective of the localization module 301 is to determine a confidence score of the collected localization data for the candidate cell or candidate pose (location and orientation) of the ADV. Collected localization data having a high confidence score will be subsequently applied, i.e., saved with versioning, to an existing localization map of the ADV according to the candidate cell location such that the existing localization map is self-evolving with the latest perceived data.

Localization module 301 can include a location module 301A, a coarse search module 301B, a fine search module 301C, a collect module 301D, an analysis module 301E, a select module 301F, and an apply module 301G. Collect module 301D periodically collects 3D point cloud and pose data from the sensors of perception module 302. 3D point cloud represents sensor data surrounding the ADV. A location module 301A may obtain the 3D point cloud and pose data from collect module 301D. For each data collection period, location module 301A can analyze the 3D point cloud and generate an ADV feature space of cells of data, each representing an area of approximately 10 cm×10 cm. Each cell can have an (x, y) coordinate in the ADV feature space, a mean intensity and a variance of the elevation. In an embodiment, the ADV feature space contains approximately 1024×1024 cells surrounding the ADV. The location module 301A can also obtain an approximate location of the ADV from a location coordinate, e.g. a GPS reading or coordinating with cell towers. The location module 301A can also obtain a high definition (HD) map of cells representing an HD map feature space of approximately 1024×1024 cells surrounding the GPS coordinate. Each cell of the HD map feature space can have an (x, y) coordinate representing an actual location of the cell in a real coordinate space, such as high resolution GPS or other coordinate system. Each cell of the HD map feature space can further include a mean intensity for the cell, and a variance of the elevation in the cell. The HD map feature space can further include annotations, including actual high-resolution location of each cell of the HD map, street address information, business information, restaurants, gas stations, and other useful information.

An error tolerance of GPS is about 3 meters. Coarse search module 301B can determine a candidate space of, e.g., 32×32 cells, surrounding the ADV, and match an ADV feature space of, e.g., 1024×1024 cells surrounding each candidate cell of the candidate space with an HD map feature space of, e.g., 1024×1024 cells. Matching is performing using a similarity metric that performs a hybrid Gaussian fit of the candidate cell feature space (e.g. 1024× 1024 cells) to the HD map feature space (e.g. 1024×1024 cells). The similarity metric is as follows:

$$P(z \mid x, y, m) = \Pi_{i,j} \exp\left(\frac{-(m_{r_{(i-x,j-y)}} - z_{r_{(i,j)}})^2}{2*(m_{\sigma_{(i-x,j-y)}} + z_{\sigma_{(i,j)}})^2}\right)^\alpha;$$

where P(z|x, y, m) represents a similarity score for the candidate feature space surrounding a candidate cell to the HD map feature space, i and j are iterators each ranging from 1 ... 1024, (x, y) are the coordinates of a candidate cell, m represents map feature space cell data, z represents ADV feature space cell data, r represents the mean of a value, σ represents the variance of a value, and α is a tuning parameter. In an embodiment, the mean intensity of ADV and HD map feature space cell data are used in the numerator of the exp function and the variance of elevation of ADV and HD map feature space data is used in the denominator of the exp function. The similarity metric used to determine a similarity score for each candidate cell in the candidate space of, e.g., 32×32 cells. In an embodiment, a coarse search of the candidate space is performed by determining the similarity metric for, e.g. every other cell, or every third cell, or other increment. A highest similarity score from among the candidate cells is determined. In an embodiment, a fine search is performed by fine search module 301C around the candidate cell with the highest similarity score of the coarse search, above. A fine search space is a second set of candidate cells, e.g. 3×3 cells. The fine search can be performed using the similarity metric for each of the second set of candidate cells. The candidate cell having the highest similarity score from the second set of candidate cells is used as the best matching cell to the center of the HD map feature space. An offset from the ADV coordinate in the ADV feature space to the best matching cell can be used to determine the high resolution location of the ADV with respect to the HD map feature space.

As can be seen above, the similarity score computed in real-time can be computationally intensive. In an embodiment, after, or during, the computation of the similarity score of a first candidate cell, a range of intensity values and a range of elevation values can be determined. For example, the range of intensity values can be determined as the lowest and highest difference values between the HP map mean intensity and ADV feature space cell mean intensity. The range of elevation values can be determined as the lowest and highest sum of values of the HP map feature space elevation variance and ADV feature space cell elevation variance. Once a range is determined for the mean intensity and elevation variance, a step-wise increment can be determined for each. For example, if the range of the mean intensity difference is 0.1 through 14.9, then a range for intensity of 0, 1, 2, ..., 15 can be used as an estimated range for the difference of the mean intensity for an HD map feature space cell and an ADV feature space cell. Similarly, if the range for elevation variance is, e.g., in the range of 0.0 through 0.81, then a range for elevation of 0.0, 0.1, 0.2, ..., 0.8 can be used as an estimated range for the sum of elevation variance between the HD map feature space cell elevation variance and the ADV feature space cell. Using the determined estimated ranges, above, a table of estimated similarity values can be generated by computing the similarity metric for each combination of the range of mean intensities and range of elevation variances. This substantially reduces the amount of computation to determine a good estimate of the similarity score for a candidate cell.

In an embodiment, the coarse search described above can use the lookup table of similarity scores. The fine search described above can compute the similarity score for each candidate cell in the fine search. In an embodiment, the lookup table can be used for the fine search similarity scores.

Analysis module 301E can determine confidence scores for collected localization data with respect to a candidate cell or pose. In one embodiment, a first confidence score may be determined by ranking each of the candidate cells. A candidate cell may be ranked by dividing a similarity score of the candidate cell having the highest similarity score by a similarity score of the candidate cell with the second highest similarity score. A computation value of greater than a predetermined threshold, e.g., one, obtains a high confidence score. A computation value of less than or equal to the predetermined threshold obtains a low confidence score. In other words, the system should identify only one single candidate cell with the highest ranking, or none.

In another embodiment, analysis module 301E may determine a second confidence score for the collected localization data by analyzing a consistency of the collected real-time pose associated with the collected localization data in comparison with a previously collected real-time pose of the ADV. Collect module 301D may periodically collect real-time pose data at a frequency of 10 Hertz or once every 1/10 of a second. Based on an approximate velocity of the ADV (provided by IMU sensors), the frequency of data collection, a current real-pose is consistent with a previous collected pose if a change in distance of the poses is within an expected distance plus an error tolerance of the sensors sensing the location of the real-time poses and the change in orientation is within a predetermined threshold. If the collected real-time pose is consistent with a previous collected pose then the localization data obtains a high confidence score. Otherwise, the localization data obtains a low confidence score.

In one embodiment, analysis module 301E may determine a third confidence score for the collected localization data associated with a collected real-time pose by analyzing the completeness of a map feature space surrounding the collected real-time pose. When location module 301A obtains a high definition (HD) map of cells representing a map feature space of approximately 1024×1024 cells surrounding the GPS coordinate, each cell of the map feature space may or may not be occupied by a mean intensity and a variance in elevation, i.e., it may be a blank cell. In another embodiment, the third confidence score may be determined based on spatial completeness or an occupancy rate of the map feature space, such that a full spatial occupancy rate returns a high confidence score for the collected localization data. Otherwise, a low confidence score is assigned. Alternatively, the third confidence score may be assigned based on the percentage occupancy rate of the map feature space.

In another embodiment, each cell or group of cells in the high definition (HD) map of cells representing a map feature space of approximately 1024×1024 may include a timestamp and/or a version number. The third confidence score may be determined based on temporal completeness or staleness of the cells in the map feature space based on the timestamp and/or version number and a predetermine temporal threshold, such that a map feature space having the most recent data, i.e., data within the predetermined temporal threshold, or version number returns a high confidence score for the collected localization data. Otherwise, a low confidence score is assigned. Alternatively, the third confidence score may be assigned based on the percentage temporal occupancy rate of the map feature space, e.g., a percentage of occupied cells having timestamps within a predetermined temporal threshold.

In one embodiment, select module 301F may select a candidate cell from a list of candidate cells in a fine search space with the highest confidence score based on the confidence scores determined by analysis module 301E. Apply module 301G applies a subset of the collected localization data to a localization map based on the selected candidate pose or candidate cell with the highest confidence score to update or evolve the localization map. In one embodiment, applying a subset of the collected localization data onto the first localization map includes saving a subset of the collected localization data as incremental versions of environment fragments in the first localization map. In another embodiment, a subset of the collected localization data is saved when the ADV is no longer interested in the subset of the collected localization data. In another embodiment, the ADV is no longer interested in the subset of the collected localization data when a distance between a position of the ADV and the subset of the collected localization data is above a predetermined threshold. In another embodiment, a distance between a position of the ADV and the subset of the collected localization data is above a predetermined threshold when the subset of the collected localization data is not in an ADV feature space surrounding the ADV.

Perception and planning system 110 can also include a perception module 302. Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, map update module 306 may save a subset of ADV feature space, or the ADV feature space to localization map. Map update module 306 may align the ADV feature space, or subsets thereof, to a localization map using techniques such as SLIM, ICP, or LIDAR localization, and upload the aligned ADV feature space, or subsets thereof to a storage medium of the ADV or to a remote cloud server.

Persistent storage device 352 can include map and route information 311, map grid 312, and lookup table 313. Map and route information can be used to determine a sequence of navigation operations to arrive and a destination. Navigation operations can be expressed as arcs in a graph with weights and attributes that characterize the route, such as speed, traffic, signals, road type, etc. Map grid 312 can be a complete map grid of all known HD map grid feature space within a certain driving locality, such as "within the U.S." or "within California" or "within San Francisco." In an embodiment, map grid 312 can be downloaded as needed from a server, e.g. server 103 or 104, for a radius around the ADV, such as a 100 mile radius. Lookup table 313, described above, can be written to memory 351 or persistent storage 352.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4A:
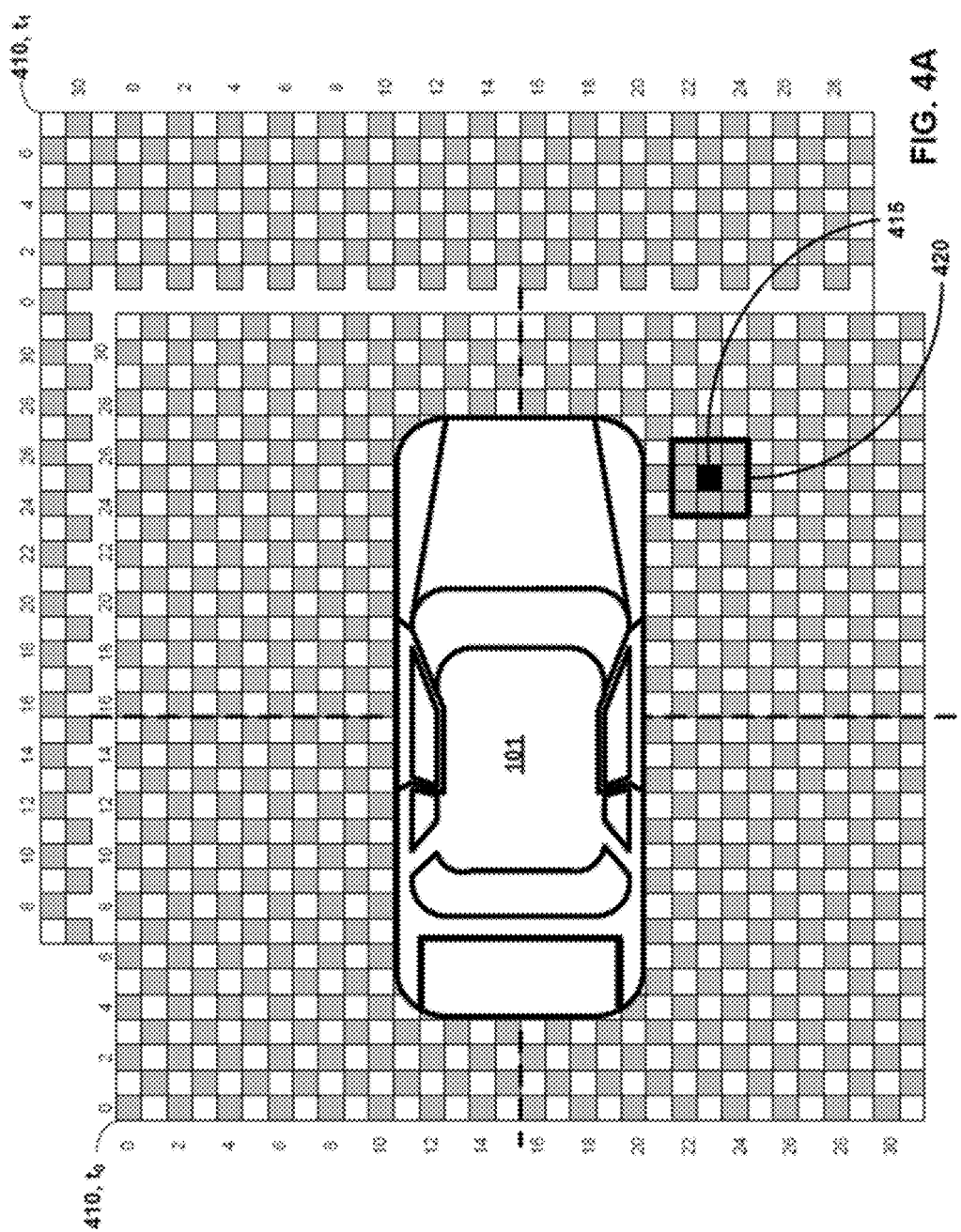
FIG. 4A illustrates and ADV surrounded by an ADV coarse search space and ADV fine search space of candidate cells to use for searching an HD map to determine the location of the ADV with respect to the HD map, according to some embodiments.

FIG. 4A illustrates and ADV surrounded by an ADV coarse search space 410 and ADV fine search space of candidate cells 420 to use for searching an HD map to determine the location of the ADV with respect to the HD map, according to some embodiments. An ADV 101 can have a localization module 301 that receives 3D point cloud data from perception module 302. Location module 301A can generate an ADV feature space of e.g. 1024×1024 cells from the 3D point cloud data. Each cell can be, e.g. 10 cm×10 cm and can include (x, y) position coordinates with respect to the ADV, a mean intensity value, an elevation variance value, and other sensor data.

As described above, with reference to FIG. 3, it is an objective of the Localization Module 301 to determine an accurate location of the ADV with respect to the real world and an HD map representing the real world around the ADV. The ADV can use, e.g. a GPS reading to obtain the HD map section representing the real world around the ADV. The HD map can be, e.g., 1024 cells×1024 cells, each cell representing, e.g. 10 cm×10 cm. Coarse search module 301B can select a coarse search candidate space 410 from the ADV feature space. The coarse search candidate space 410 is subset of the ADV feature space that surrounds the ADV. The coarse search candidate space 410 can be, e.g. 32×32 cells. In an embodiment, the coarse search candidate space 410 can be traversed in increments of e.g. two. For example, a similarity metric can be determined for coarse search candidate space 410 at time t0 at (x, y)=(0, 0). A next similarity metric can be determined for the coarse search candidate space 410 at time t0 at (x, y)=(2, 0), then at (4, 0), and so on. After searching the coarse search candidate space 410 at time t0, the coarse search can locate a candidate cell 415 in the coarse search candidate space 410 having a highest similarity metric, indicating that the candidate cell feature space most closely matches the HD map feature space.

Fine search module 301C can determine a fine search candidate space 420 surrounding the candidate cell 415 having the highest similarity metric. In an embodiment, the fine search candidate space 420 can be, e.g., 3 cells×3 cells surrounding the candidate cell 415 with the highest similarity score in the coarse search candidate space 410. Fine search module 301C can determine a similarity metric for each candidate cell in the fine search candidate space 420. Fine search module 301C can determine a highest similarity score from among the candidate cells in the fine search candidate space 420. The candidate cell with the high similarity score from the fine search candidate cells 420 can be then be determined as coinciding with the center of the HD map feature space. An offset from the ADV to the center of the HD map can be determined, and the offset can be used to determine the location of the ADV in the real world corresponding to the HD map feature space, with high accuracy.

At time t1, the above process can be repeated. Assuming that the ADV is moving, the ADV feature space at time t1 may have some common data with the ADV feature space at time t0. FIG. 4A illustrates a 32×32 coarse search candidate space 410 at time t0 and at time t1. An analogous concept applies to the entire ADV feature space (1024×1024 cells) at time t0 and time t1. Rather than shifting data within the data structure that holds, e.g. the coarse search candidate space, as the ADV moves localization module 301 can determine how much the ADV has moved and how much of the data in the coarse search space 410 is the same at time t1 as at time t0, but is logically displaced by new candidate search space cells of data at time t1. Instead of shifting data in the data structure, an array of indices can be shifted for each of the x-coordinate and y-coordinate directions, as is appropriate for the movement of the ADV.

As shown in FIG. 4A, candidate search space 410 at time t1 has added new data as the ADV moves to the right. In the example in the figure, the new coarse search candidate space data is stored in columns 0, 2, 4, and 6 of the coarse search candidate space, overwriting old data. In an embodiment, as the ADV moves forward from time t0 to time t1, new candidate search space cells would be logically be added at e.g. at columns 32, 33, et seq. In an example candidate search space of 32×32 cells, the x-coordinate index of the candidate search array space can be incremented, modulo 32, to obtain the candidate search space array index at which to add new ADV feature space data. Thus, logical column 32 would be 32 modulo 32=0, logical column 33 would be 33 modulo 32=1, et seq. The y-coordinate of a candidate search space grid can be similarly computed. The above example of adding data to a candidate search space of 32×32 can be extended to the ADV feature space, which can be approximately 1024×1024 cells. In an embodiment, the ADV feature space can be 1024×1024 cells to facilitate the ADV feature space data array modulus computation.

Figure 4B:
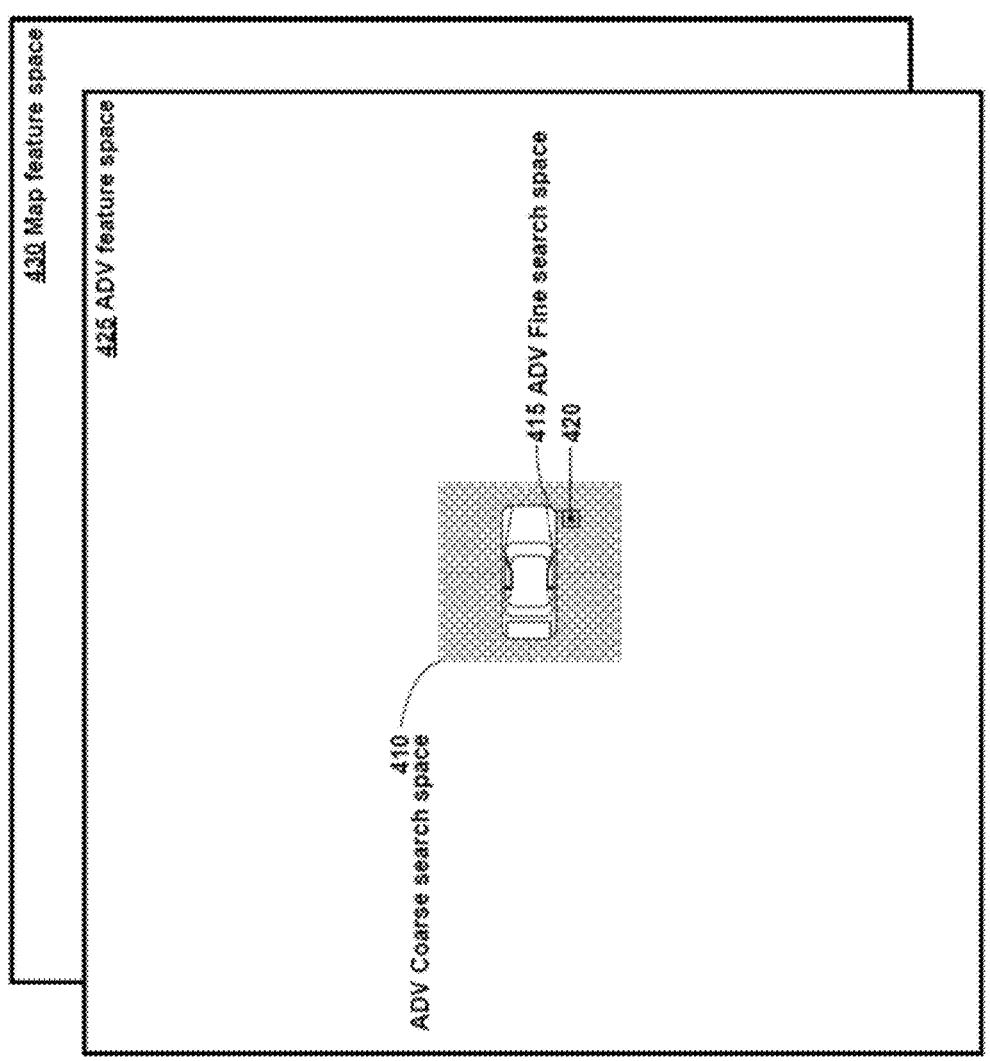
FIG. 4B illustrates and ADV surrounded by an array or grid of candidate cells to use for searching an HD map to determine the location of the ADV with respect to the HD map, and an ADV feature space surrounding the ADV coarse and fine candidate search space, according to some embodiments.

FIG. 4B illustrates and ADV 101 surrounded by an array or grid of candidate cells to use for searching an HD map to determine the location of the ADV with respect to the HD map, and an ADV feature space surrounding the ADV coarse and fine candidate search space, according to some embodiments. As described above, an object of the localization module 301 is alignment of an ADV feature space, generated from a 3D point cloud of sensor data, to a high definition (HD) map feature space that is centered on a location, e.g. a GPS coordinate, obtained by the ADV. Aligning the ADV feature space to the HD map feature space is an operation in a process to determine the ADV location in the real world, and with respect to the HD map, with high accuracy.

FIG. 4B illustrates the coarse search space 410 of FIG. 4A set in the context of the ADV feature space 425 and HD map feature space 430. The HD map feature space 430 may be offset from the ADV feature space 425 due to limited accuracy of the location sensor, e.g. GPS coordinate or cell tower coordination that was used to obtain the approximate location of the ADV. For each candidate cell traversed in the ADV coarse search space 410, a feature space of approximately 1024×1024 cells surrounding the candidate cell is compared to the HD map feature space 430 and a similarity score is determined for the candidate cell. A candidate cell having a highest similarity score 420 among the candidate cells in ADV coarse search space 410 is used to generate a fine search space 415 of approximately 3×3 cells. Each candidate cell in the ADV fine search space 415 is traversed and a similarity score is determined. The ADV fine search space 415 candidate cell with the highest similarity score from among the fine search candidate cells 415 is selected as being the cell which best aligns the ADV feature space 425 to the HD map feature space 430. An offset is determined from the ADV to the candidate cell in the ADV fine search space 415 having the highest similarity score to the HD map feature space. The offset is used to determine, with high accuracy, the location of the ADV with respect to the HD map and real world.

Figure 5A:
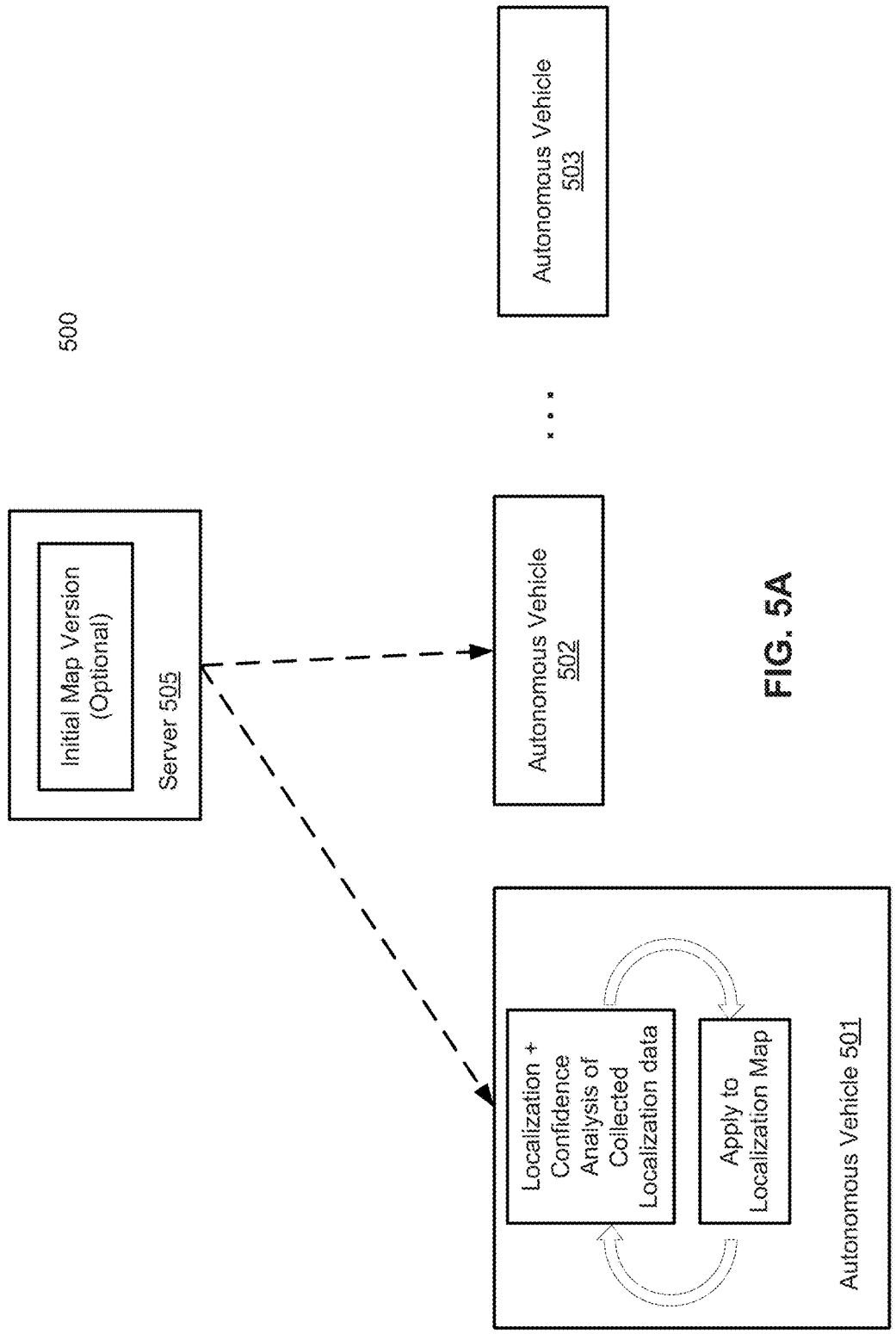
FIG. 5A is a block diagram illustrating a networked system according to another embodiment of the invention.

According to one embodiment, as shown in FIG. 5A, ADVs 501-502 may optionally download an initial map version from server 505 or periodically download a map version from server 505. ADV 501 may be ADV 101 of FIG. 1 and Server 505 may be server 104 of FIG. 1. ADV 501 may be cruising on a road, or idling along the road at the time of download. Once ADVs 501-502 receive an initial map version, ADVs 501-502 each have a self-contained version of localization map. ADV 501 may then self-evolve its local version of localization map. For example, when ADV 501 is online and driving on the road, ADV 501 gathers localization data from onboard sensors such as a GPS/IMU unit and a LIDAR scanner to perform localization and confidence analysis on the localization data. Localization data with a high confidence will be applied to the localization map of the ADV to generate a new version of the localization map to subsequently determine a location of the ADV. Low confidence localization data will be discarded. In this example, ADV 503 does not download an initial version from server 505. ADV 503 may have a blank initial version of a localization map. However, ADV 503 may generate subsequent localization map versions from its sensor data based on hardware positioning methods such as GPS/IMU and/or RTK. ADV 503 may generate a first localization map version based on only a confidence score from determining consistency of a collected real-time pose.

Figure 5B:
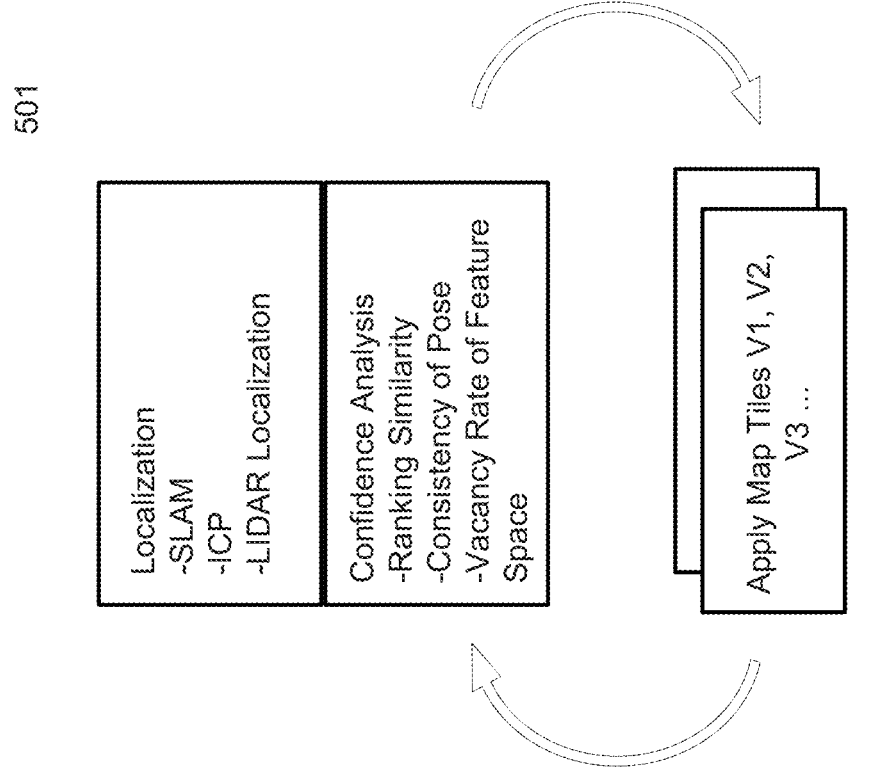
FIG. 5B is a block diagram illustrating an example of an autonomous vehicle according to another embodiment of the invention.

ADV 501 of FIG. 5B illustrating the ADV 501 of FIG. 5A. Referring to FIG. 5B, while on the road, ADV 501 collects localization map data, such as 3D point cloud from a LIDAR scanner, and a real-time pose from a GPS/IMU unit. ADV 501 may perform a localization method, such as LIDAR localization, SLAM, or ICP on the 3D point cloud data. The localization method provides a similarity score for candidate cells. Candidate cells in a fine search space are ranked and are assigned a first confidence score based on similarity scores of the candidate cells.

A second confidence score may be assigned to the collected localization data/real-time pose based on consistency of the real-time pose in comparison with a previous pose of the ADV. Based on the data collection time interval and a sensed velocity of ADV 501, an approximate distance traveled can be calculated. A real-time pose can be determined to be consistent with a previous pose of the ADV if a difference in distance of the poses is within the approximate distance traveled plus an error tolerance in the measurement devices, and a difference in orientation of the poses is within a predetermined threshold.

A third confidence score may be assigned to the collected localization data/real-time pose based on a data to vacancy ratio, i.e., the number of cells with data versus the number of blank cells, or a vacancy rate of the HD map feature space corresponding to an ADV feature space. To determine a similarity score for each candidate cell in the LIDAR localization method, an ADV feature space of approximately 1024×1024 cells surrounding the candidate cell is compared to an HD map feature space. Each cell contains a mean intensity, and a variance in elevation of LIDAR readings. The data to vacancy ratio of this HD map feature space can be determined by traversing the 1024×1024 cells, or portions thereof, to determine if data exists in the cells. The third confidence score may be assigned to the collected localization data/real-time pose based on the data to vacancy ratio, i.e., a high confidence score is assigned for a data to vacancy ratio that is greater than a predetermined threshold. Alternatively, a confidence score may be assigned to the collected localization data/real-time pose proportional to a data to vacancy ratio. In another embodiment, each of the 1024× 1024 cells may contain a timestamp or version number. The third confidence score may be assigned to the collected localization data/real-time pose based on a temporal vacancy rate, i.e., even if there is data in a cell, if the data is older than a predetermined age then the cell is treated as vacant for the purpose of determining a temporal vacancy rate. A high confidence score may be assigned to the localization data if the data to temporal vacancy ratio is greater than a predetermined threshold. Alternatively, a confidence score may be assigned to the collected localization data/real-time pose proportional to a data to temporal vacancy ratio.

Figure 6:
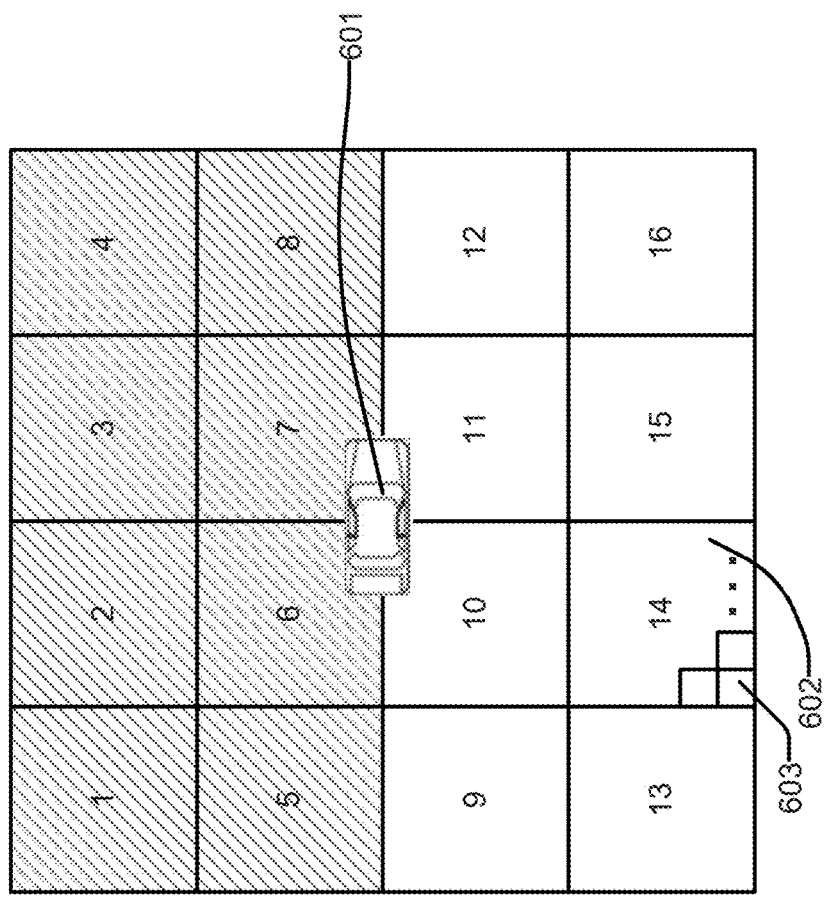
FIG. 6 is a diagram illustrating a map feature space corresponding to an ADV feature space according to one embodiment of the invention.

FIG. 6 is a diagram illustrating a map feature space 600 corresponding to an ADV feature space, according to one embodiment. Map feature space 600 is used in this example to illustrate how the system determines a confidence score based on spatial completeness of a map feature space such as block 802 of FIG. 8. Referring to FIG. 9, ADV 601 senses a real-time location and orientation, i.e., a real-time pose, via its GPS/IMU unit. A corresponding map feature space for a predetermined size, such as a 100 meter×100 meter block, is retrieved from a memory storage device of the ADV. Map feature space 600 may be subdivided into a number of map files, in this example, 16 map tiles 1-16. Map tile 602 corresponds to map tile 14. Each map tile is associated with a number of corresponding mean intensity and elevation variance cells such as cell 603. Such information may be stored in a data structure associated with the corresponding map tiles. In this example, map tiles 1-8 are filled with a pattern to highlight that it is occupied with data while map tiles 9-16 are blanks. A confidence score based on percentage occupancy of map feature space 600 would result in a confidence score of 50%.

Figure 7:
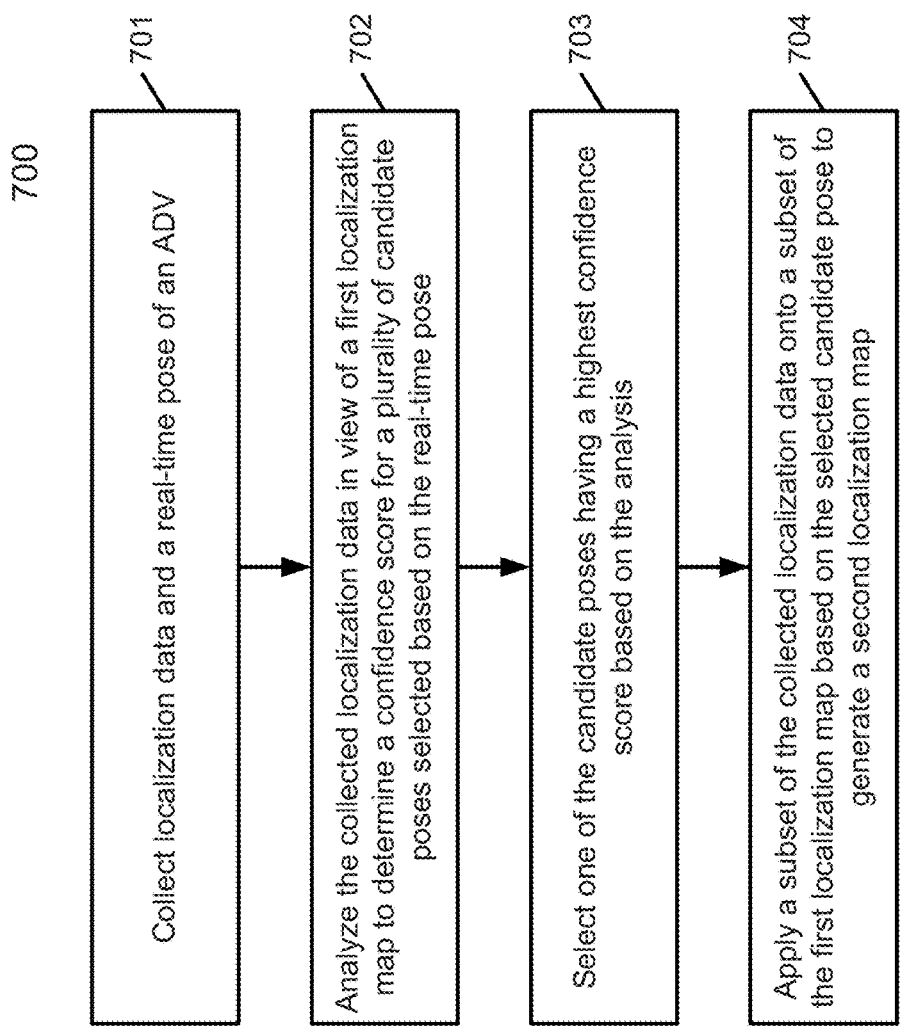
FIG. 7 is a flow diagram illustrating an overview of a method of updating a self-contained self-evolving localization map according to one embodiment of the invention.

FIG. 7 is a flow diagram illustrating a process to update a localization map according to one embodiment. Process 700 may be performed by processing logic which may include software, hardware, or a combination thereof. For example, process 700 may be performed by a localization module of an autonomous vehicle, such as localization module 301 of perception and planning system 110. Referring to FIG. 7, at block 701, processing logic collects a localization data and a real-time pose of an ADV. At block 702, processing logic analyzes the collected localization data in view of a first localization map to determine a confidence score for a plurality of candidate poses selected based on the real-time pose. At block 703, processing logic selects one of the candidate poses having a highest confidence score based on the analysis. At block 704, processing logic applies a subset of the collected localization data onto the first localization map based on the selected candidate pose to generate a second localization map, such that the second localization map is utilized to subsequently determine a location of the ADV. In one embodiment, the collected real-time pose of the ADV approximates a location and an orientation of the ADV, such that the plurality of candidate poses is determined based on the collected real-time pose and an error tolerance of the collected real-time pose.

Figure 8:
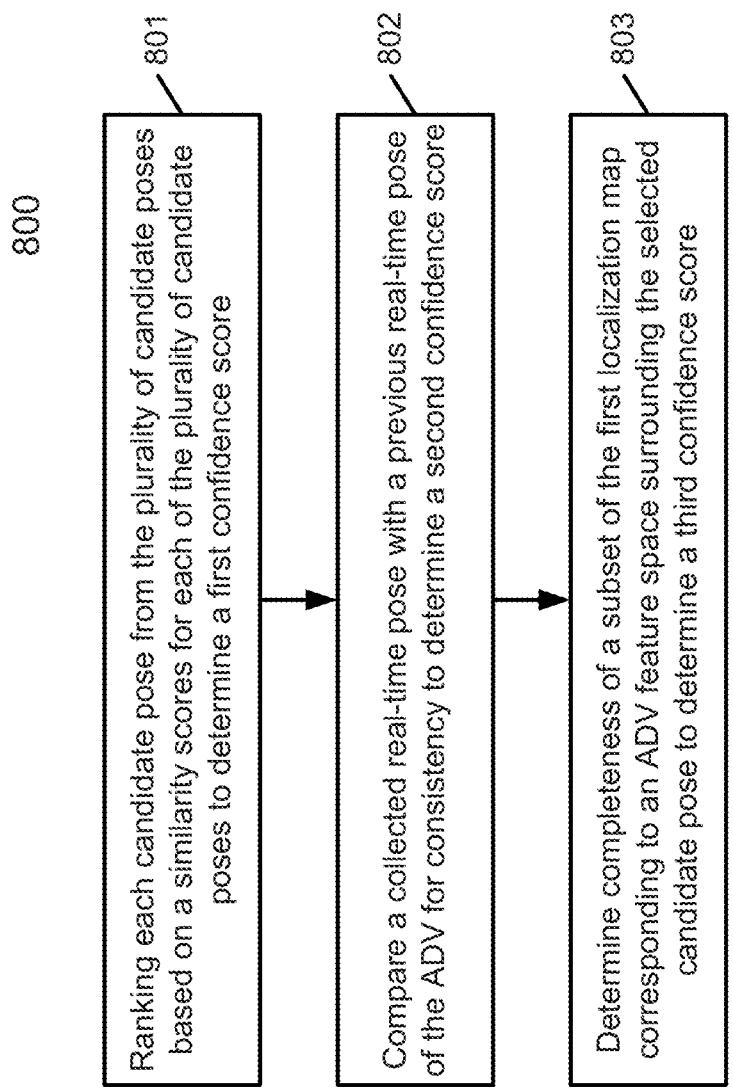
FIG. 8 is a flow diagram illustrating three factors to determine a confidence score for collected localization data to apply to a self-contained self-evolving localization map according to one embodiment of the invention.
Figure 9:
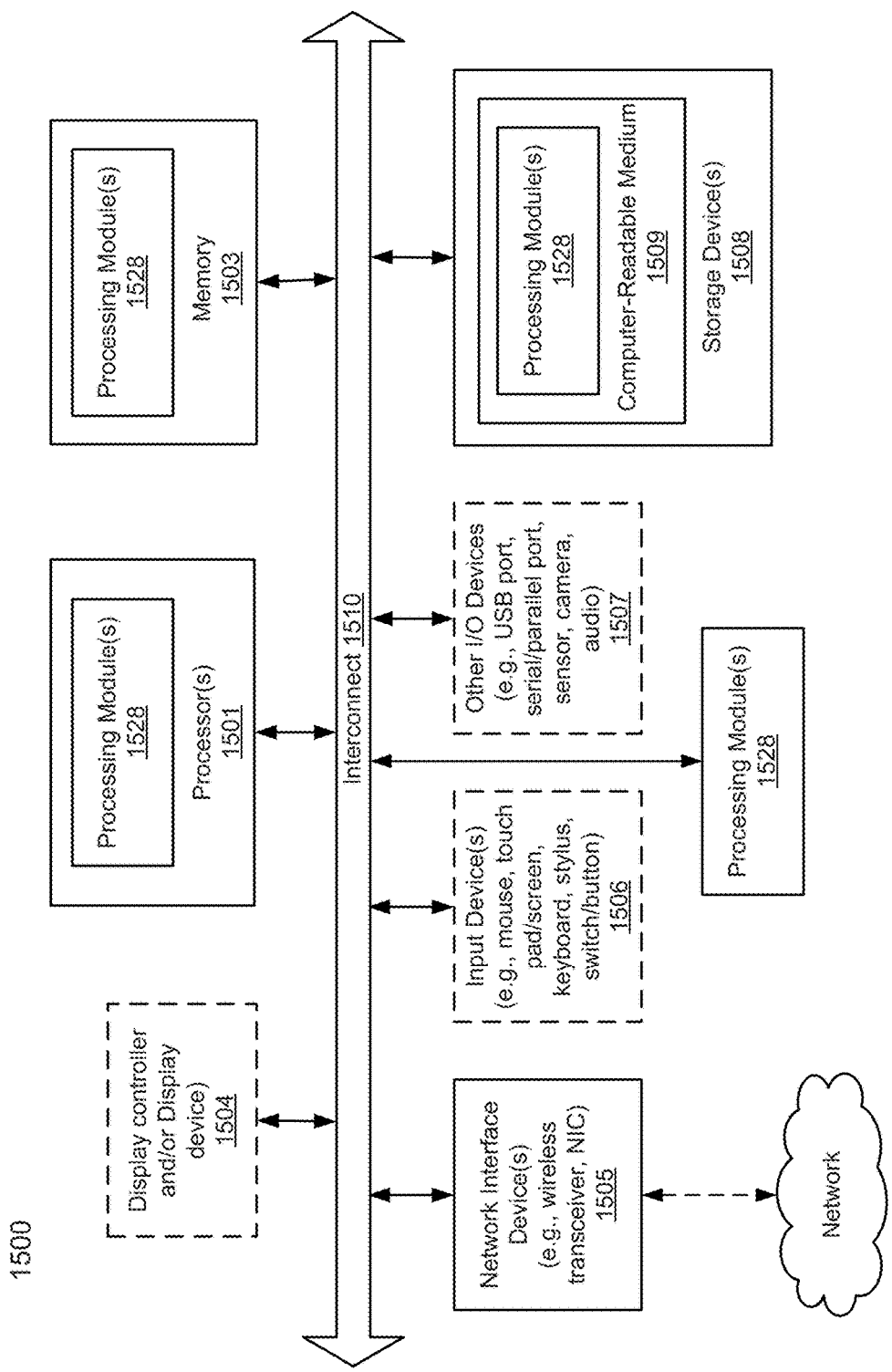
FIG. 9 is a block diagram illustrating a data processing system according to one embodiment of the invention.

FIG. 8 is a flow diagram illustrating a process to analyze collected localization data. Process 800 may be performed by processing logic which may include software, hardware, or a combination thereof. For example, process 800 may be performed by a localization module of an autonomous vehicle, such as localization module 301 of perception and planning system 110. Process 800 may be performed as part of operations of block 702. Referring to FIG. 8, at block 801, a collected localization data is analyzed by ranking each candidate pose of the plurality of candidate poses based on a similarity score for each of the plurality of poses to determine a first confidence score such that the first confidence score is highest if a single candidate pose of the plurality of candidate poses has the highest ranking. In another embodiment, a similarity score is determined based on a subset of the ADV feature space surrounding the collected real-time pose and a subset of the first localization map surrounding the collected real-time pose using a similarity metric.

At block 802, a collected localization data is analyzed by comparing the collected real-time pose with a previous real-time pose of the ADV for consistency to determine a second confidence score such that the second confidence score is highest if the collected real-time pose is consistent with a previous real-time pose of the ADV. In another embodiment, the collected real-time pose is consistent with a previous real-time pose of the ADV if the collected real-time pose is within a distance traveled by the ADV from the previous real-time pose of the ADV in view of a time delay. The time delay, for example, could be a time delay between when the collected real-time pose and the previous real-time pose was captured.

At block 803, a collected localization data is analyzed by determining completeness of a subset of the first localization map corresponding to an ADV feature space surrounding the collected real-time pose to determine a third confidence score, such that the third confidence score is highest if the subset of the first localization map data is complete. In another embodiment, determining completeness includes determining spatially completeness of the subset of the first localization map corresponding to an ADV feature space surrounding the collected real-time pose based on data to vacancy ratio of the subset of the first localization map corresponding to the ADV feature space. In another embodiment, determining completeness includes determining temporal completeness of a subset of the first localization map corresponding to a subset of an ADV feature space surrounding the collected real-time pose based on an elapse of time of the subset of the first localization map corresponding to the ADV feature space.

In one embodiment, a subset of the collected localization data is applied onto the first localization map by saving a subset of the collected localization data as incremental versions of environment fragments, or map tiles, in the first localization map. As discussed above, the first localization map be a 2-D grid space (x, y) having each cells containing a mean intensity and an elevation variance value. The collected localization data may be data collected from a LIDAR scanner for a space of about 100×100 meter in area, or 1024×1024 cells with each cell about 10 cm×10 cm in area. Each cell of the collected localization data may have a mean intensity and a variance elevation. To apply a subset of the collected localization data to a localization map, each cells of the subset of the collected localization data is merged with the localization map data. A collected mean intensity value may be merged with a localization map mean intensity as follows:

$$m_{12} = \frac{m_1 \times c_1 + m_2 \times c_2}{c_1 + c_2};$$

where $m_{12}$ represents a merged mean intensity, m1 represents a collected mean intensity, $m_2$ represents a localization map mean intensity, $c_1$ represents the number of observed scans associated with $m_1$, and $c_2$ represents the number of observed scans associated with $m_2$. An elevation variance may be merged with a collected elevation variance as follows:

$$v_{12} = \frac{v_1 \times (n_1 - 1) + v_2 \times (n_2 - 1)}{n_1 + n_2};$$

where $v_{12}$ represents a merged elevation variance, $v_1$ represents a collected elevation variance, $v_2$ represents a localization map elevation variance, $n_1$ represents the number of observed scans associated with $v_1$, and $n_2$ represents the number of observed scans associated with $v_2$.

As an ADV travels along a road, a portion of localization map, e.g., map tiles for areas that are within view of the ADV feature space is dynamically loaded into a map feature space. In another embodiment, a subset of the collected localization data, e.g., localization data in the ADV feature space is saved when the ADV is no longer interested in the subset of the collected localization data. In another embodiment, the ADV is no longer interested in the subset of the collected localization data when a distance between a position of the ADV and the subset of the collected localization data is above a predetermined threshold, i.e., ADV has since traveled a distance and a different real-time pose rendered previous collected localization data beyond a predetermined distance. In another embodiment, a distance between a position of the ADV and the subset of the collected localization data is above a predetermined threshold when the subset of the collected localization data is not in an ADV feature space surrounding the ADV since the ADV has traveled.

FIG. 9 is a block diagram illustrating an example of a data processing system which may be used with one embodiment of the invention. For example, system 1500 may represent any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, localization module 301 of FIG. 3. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to update a localization map of an autonomous driving vehicle (ADV), the method comprising:

collecting localization data and a real-time pose of the ADV;

analyzing the collected localization data in view of a first localization map to determine a first confidence score for a plurality of candidate cells within a search space of the collected localization data based on the real-time pose, wherein analyzing the collected localization data comprises: determining a similarity score for each of a the plurality of candidate cells, ranking the plurality of candidate cells by the respective similarity score for each of the candidate cells, and dividing a similarity score of a candidate cell having a highest similarity score by a similarity score of a candidate cell having a second highest similarity score to determine the first confidence score of the plurality of candidate cells;

determining whether to select the candidate cell having the highest similarity score based on the first confidence score; and applying a subset of the collected localization data onto the first localization map based on the selected candidate cell to generate a second localization map, wherein the second localization map is utilized to subsequently determine a location of the ADV.

2. The method of claim 1, wherein the collected real-time pose of the ADV approximates a location and an orientation of the ADV, wherein the plurality of candidate poses is determined based on the collected real-time pose and an error tolerance of the collected real-time pose.

3. The method of claim 1, wherein determining whether to select the candidate cell having the highest similarity score based on the first confidence score comprises making the selection if the first confidence score exceeds a predetermined threshold.

4. The method of claim 3, wherein the similarity score for each of the plurality of candidate cells is determined based on a similarity metric of an ADV feature space surrounding the collected real-time pose.

5. The method of claim 1, wherein analyzing the collected localization data comprises comparing the collected real-time pose with a previous real-time pose of the ADV to determine a second confidence score, such that the second confidence score is highest if the collected real-time pose is consistent with a previous real-time pose of the ADV.

6. The method of claim 5, wherein analyzing the collected localization data further comprises determining that the second confidence score is a highest score if the collected real-time pose is within a distance travelled by the ADV from the previous real-time pose of the ADV in view of a time delay.

7. The method of claim 1, wherein analyzing the collected localization data comprises determining completeness of a subset of the first localization map corresponding to an ADV feature space surrounding the collected real-time pose to determine a third confidence score, such that the third confidence score is highest if the subset of the first localization map data is complete.

8. The method of claim 7, wherein determining completeness comprises determining spatial completeness of the subset of the first localization map corresponding to an ADV feature space surrounding the collected real-time pose based on a vacancy ratio of the subset of the first localization map corresponding to the ADV feature space.

9. The method of claim 7, wherein determining completeness comprises determining temporal completeness of a subset of the first localization map corresponding to a subset of an ADV feature space surrounding the collected real-time pose based on an elapse of time of the subset of the first localization map corresponding to the ADV feature space.

10. The method of claim 1, wherein applying a subset of the collected localization data onto the first localization map comprises saving a subset of the collected localization data as incremental versions of environment fragments in the first localization map.

11. The method of claim 10, wherein a subset of the collected localization data is saved when the ADV is no longer interested in the subset of the collected localization data.

12. The method of claim 11, wherein the ADV is no longer interested in the subset of the collected localization data when a distance between a position of the ADV and the subset of the collected localization data is above a predetermined threshold.

13. The method of claim 12, wherein a distance between a position of the ADV and the subset of the collected localization data is above a predetermined threshold when the subset of the collected localization data is not in an ADV feature space surrounding the ADV.

14. A non-transitory machine-readable medium having instructions stored therein, which when executed by a processor, cause the processor to perform operations, the operations comprising:
collecting localization data and a real-time pose of the ADV;
analyzing the collected localization data in view of a first localization map to determine a first confidence score for a plurality of candidate cells within a search space of the collected localization data based on the real-time pose, wherein analyzing the collected localization data comprises: determining a similarity score for each of the plurality of candidate cells, ranking the plurality of candidate cells by the respective similarity score for each of the candidate cells, and dividing a similarity score of a candidate cell having a highest similarity score by a similarity score of a candidate cell having a second highest similarity score to determine the first confidence score of the plurality of candidate cells;
determining whether to select the candidate cell having the highest similarity score based on the first confidence score; and
applying a subset of the collected localization data onto the first localization map based on the selected candidate cell to generate a second localization map, wherein the second localization map is utilized to subsequently determine a location of the ADV.

15. The non-transitory machine-readable medium of claim 14, wherein determining whether to select the candidate cell having the highest similarity score based on the first confidence score comprises making the selection if the first confidence score exceeds a predetermined threshold.

16. The non-transitory machine-readable medium of claim 14, wherein analyzing the collected localization data comprises comparing the collected real-time pose with a previous real-time pose of the ADV to determine a second confidence score such that the second confidence score is highest if the collected real-time pose is consistent with a previous real-time pose of the ADV.

17. The non-transitory machine-readable medium of claim 14, wherein analyzing the collected localization data comprises determining completeness of a subset of the first localization map corresponding to an ADV feature space surrounding the collected real-time pose to determine a third confidence score, such that the third confidence score is highest if the subset of the first localization map data is complete.

18. A data processing system, comprising:
a processor; and
a memory coupled to the processor to store instructions, which when executed by the processor, cause the processor to perform operations, the operations including collecting localization data and a real-time pose of the ADV;
analyzing the collected localization data in view of a first localization map to determine a first confidence score for a plurality of candidate cells within a search space of the collected localization data based on the real-time pose, wherein analyzing the collected localization data comprises: determining a similarity score for each of the plurality of candidate cells, ranking the plurality of candidate cells by the respective similarity score for each of the candidate cells, and dividing a similarity score of a candidate cell having a highest similarity score by a similarity score of a candidate cell having a second highest similarity score to determine the first confidence score of the plurality of candidate cells;

determining whether to select the candidate cell having the highest similarity score based on the first confidence score; and applying a subset of the collected localization data onto the first localization map based on the selected candidate cell to generate a second localization map, wherein the second localization map is utilized to subsequently determine a location of the ADV.

19. The system of claim 18, wherein determining whether to select the candidate cell having the highest similarity score based on the first confidence score comprises making the selection if the first confidence score exceeds a predetermined threshold.

20. The system of claim 18, wherein analyzing the collected localization data comprises comparing the collected real-time pose with a previous real-time pose of the ADV to determine a second confidence score such that the second confidence score is highest if the collected real-time pose is consistent with a previous real-time pose of the ADV.

21. The system of claim 18, wherein analyzing the collected localization data comprises determining completeness of a subset of the first localization map corresponding to an ADV feature space surrounding the collected real-time pose to determine a third confidence score, such that the third confidence score is highest if the subset of the first localization map data is complete.

* * * * *